(12) United States Patent
Pajovic et al.

(10) Patent No.: US 9,906,308 B1
(45) Date of Patent: Feb. 27, 2018

(54) METHODS FOR COMPENSATION OF CROSS-POLARIZATION MODULATION (XPOLM) IMPAIRMENTS IN COHERENT OPTICAL COMMUNICATIONS

(71) Applicant: Mitsubishi Electric Research Laboratories, Inc., Cambridge, MA (US)

(72) Inventors: Milutin Pajovic, Cambridge, MA (US); Kieran Parsons, Cambridge, MA (US); David Millar, Winchester, MA (US); Toshiaki Koike-Akino, Malden, MA (US); Keisuke Kojima, Weston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/244,071

(22) Filed: Aug. 23, 2016

(51) Int. Cl.
*H04B 10/00* (2013.01)
*H04B 10/61* (2013.01)
(Continued)

(52) U.S. Cl.
CPC ........... *H04B 10/6162* (2013.01); *H04B 3/32* (2013.01); *H04B 10/0795* (2013.01); *H04B 10/614* (2013.01); *H04B 2210/006* (2013.01)

(58) Field of Classification Search
CPC .... H04B 10/6162; H04B 3/32; H04B 10/614; H04B 10/0795; H04B 2210/006
See application file for complete search history.

(56) References Cited

U.S. PATENT DOCUMENTS 6,782,211 B1 8/2004 Core et al.
8,472,809 B2 6/2013 Koike-Akino et al.
(Continued)

OTHER PUBLICATIONS

Matsuda et al. "XPolM Compensation by Two-stage Phase Recovery for Baud-rate Optimized Nonlinear Transmission." Optical Fiber Communication Conference 2016 Anaheim, California United States Mar. 20-22, 2016 ISBN: 978-1-943580-07-1.
(Continued)

*Primary Examiner* — Danny Leung
(74) *Attorney, Agent, or Firm* — Gene Vinokur; James McAleenan; Hironori Tsukamoto

(57) ABSTRACT

Methods and systems for decoding symbols transmitted over an optical channel having a cross-polarization modulation (XPolM) impairment, wherein an optical signal is polarized to encode the symbols on an x-polarization and an y-polarization before transmitted. The method including receiving the optical signal transmitted over the optical channel. Sampling the optical signal to produce a sequence of digital samples, wherein each digital sample includes a measurement of each polarization of the optical signal at an instance of time. Selecting a subset of the sequence of digital samples that includes a digital sample and neighboring digital samples on the sequence. Repeating the selecting and the determining for each digital sample remaining in the sequence of digital samples to produce a sequence of cross-talk coefficients; and decoding some of the symbols from the sequence of digital samples using cross-talk models with corresponding cross-talk coefficients, wherein method steps are performed using a processor.

20 Claims, 12 Drawing Sheets

(51) Int. Cl.
*H04B 3/32* (2006.01)
*H04B 10/079* (2013.01)

(56) References Cited

U.S. PATENT DOCUMENTS

| | | | |
|---|---|---|---|
| 8,861,960 B2 | 10/2014 | Grigoryan et al. | |
| 9,628,157 B2 * | 4/2017 | Maes | H04B 7/0456 |
| 9,722,664 B2 * | 8/2017 | Nuzman | H04B 3/487 |
| 2009/0310502 A1 * | 12/2009 | Nuzman | H04B 3/32 |
| | | | 370/252 |
| 2010/0046355 A1 * | 2/2010 | Nuzman | H04B 3/487 |
| | | | 370/201 |
| 2011/0142455 A1 * | 6/2011 | Liu | H04B 10/0795 |
| | | | 398/152 |
| 2012/0076491 A1 * | 3/2012 | Yan | H04B 10/6162 |
| | | | 398/25 |
| 2012/0263464 A1 | 10/2012 | Koike-Akino et al. | |
| 2015/0030331 A1 | 1/2015 | Salsi et al. | |
| 2016/0043786 A1 * | 2/2016 | Maes | H04B 3/32 |
| | | | 375/260 |
| 2016/0080031 A1 * | 3/2016 | Kassel | H04M 11/062 |
| | | | 379/406.06 |
| 2016/0156383 A1 * | 6/2016 | Nuzman | H04M 3/306 |
| | | | 375/257 |
| 2016/0191117 A1 * | 6/2016 | Vanderhaegen | H04B 3/32 |
| | | | 370/201 |

OTHER PUBLICATIONS

Oyama et al. "Complexity Reduction of Perturbation-based Non-linear Compensator by Sub-band Processing." Optical Fiber Communications Conference and Exhibition (OFC), 2015. Mar. 22-26, 2015. INSPEC 15233217, IEEE.

Layec et al., "Generalized Maximum Likelihood for Cross-Polarization Modulation Effects Compensation," Journal of Lightwave Technology, IEEE Service Center, NY, NY, U.S. vol. 33, No. 7, Apr. 1, 2015. pp. 1300-1307.

* cited by examiner

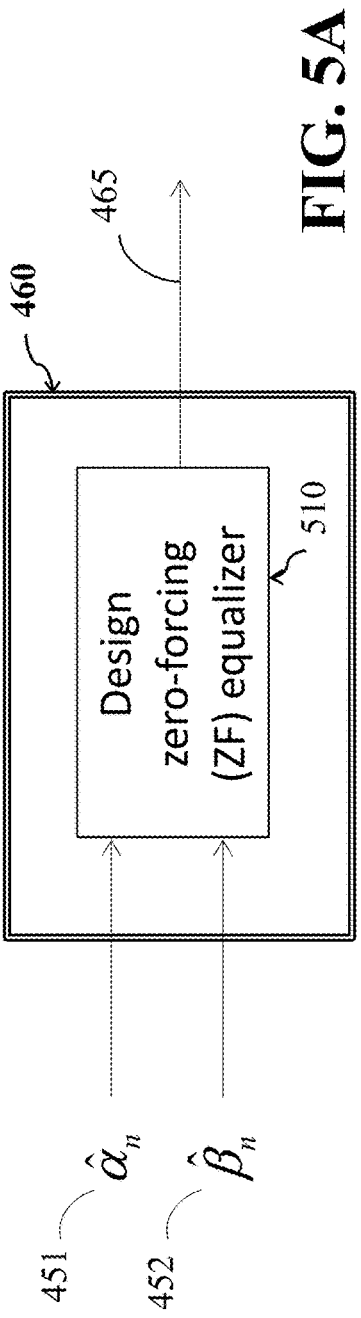
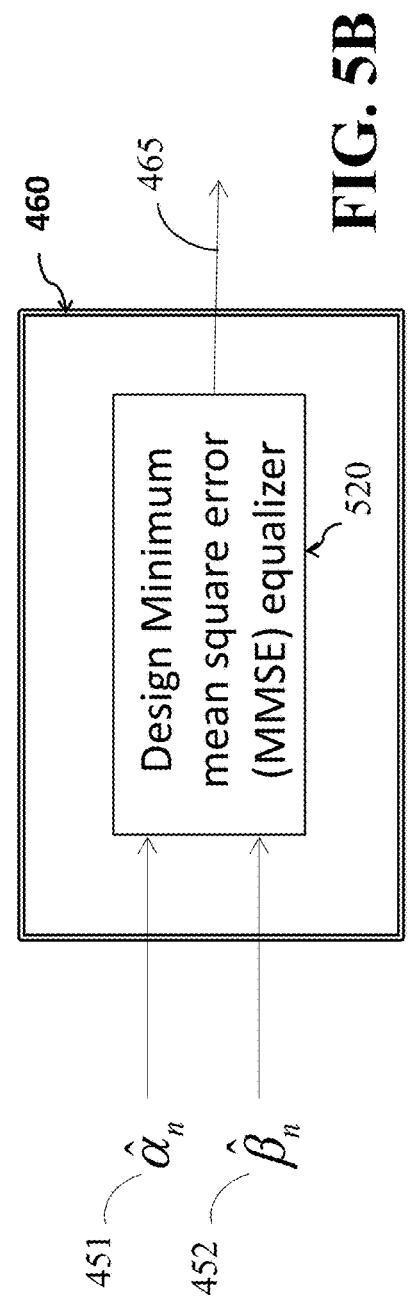

METHODS FOR COMPENSATION OF CROSS-POLARIZATION MODULATION (XPOLM) IMPAIRMENTS IN COHERENT OPTICAL COMMUNICATIONS

FIELD

The present disclosure relates generally to optical communication systems, and more particularly to decoding a symbol transmitted over an optical communication channel impaired by cross-polarization modulation (XPolM) in coherent optical communication systems.

BACKGROUND

Optical transmission systems typically include a transmitter (Tx) and a receiver (Rx) interconnected by an optical fiber link, which may be composed of one of more fiber spans.

The optical transmissions can result in nonlinear optical impairments affecting the transmitted optical signal essentially as noise. Often, identifying the magnitude of some of the nonlinear optical impairments can be beneficial for obtaining a better understanding on the received net system margin. These impairments can include cross-phase modulation (XPM), self-phase modulation (SPM), cross-polarization modulation (XPolM), and four wave mixing (FWM). In particular, the assessment of these impairments is needed to estimate various link budget parameters, including the required optical signal-to-noise ratio to achieve a specified bit-error-ratio at the Rx, and the signal power at the input to each optical fiber span that maximizes the received net system margin.

For optical communication systems that use polarization multiplexing, two optical signals are polarized orthogonally with respect to each other before transmitted in an optical channel at a certain wavelength. This doubles the bandwidth of the channel. To realize a high-speed transmission over 100 Gbps, polarization multiplexing and dense-wavelength-division multiplexing (DWDM) are often used.

However, alternating bit sequences of the polarization multiplexing signal causes the resulting polarization to change over time. This depolarization effect results in cross-polarization modulation (XPolM), which is essentially noise, as noted above. The XPolM impairment is induced by inter-channel fiber nonlinearity particularly for DWDM optical communication systems. Due to the XPolM, the dual-polarized (DP) signals, which originally were polarized orthogonally, are no longer so, and cannot be accurately separated at the receiver.

The XPolM causes rotations of the state of polarization around an axis which itself exhibits random walk on a sphere. The XPolM becomes prominent in systems with DWDM waveforms transmitted over long, dispersion managed (DM) links. The XPolM results in significant performance degradation in bit error rate or in quality factor for dual-polarized coherent optical systems.

Accordingly, there is a need for a method for decoding symbols transmitted over an optical communication channel having a XPolM impairment.

SUMMARY

Embodiments of the present disclosure provide systems and methods for decoding a symbol transmitted over an optical communication channel for canceling cross-polarization modulation (XPolM) impairment in coherent optical communication systems.

Some embodiments of the present disclosure are based on recognition that cross-polarization modulation (XPolM) impairments can result from a number of different physical properties of the propagation of an optical signal within an optical communication channel. The XPolM impairments can be modeled using a cross-talk model, which connects the transmitted signal with the received signal experiencing XPolM impairments through so-called cross-talk coefficients. The systems and methods are based on the realization that cross-talk coefficients vary rapidly, while they still exhibit a relatively short coherence, and are only slightly correlated among neighboring symbols. The present disclose incorporates this realization that there is a need to consider more accurately unknown or small correlations of the cross-talk coefficients when estimating XPolM.

In particular, the received optical signal typically comprises a first polarization component (x-polarization) and a second polarization component (y-polarization), wherein the first and second polarization components include sequences of symbols, respectively. Embodiments of the present disclosure recover a symbol by jointly considering a certain number of sequenced samples following and preceding that symbol, and by iteratively updating the maximum likelihood estimates of the cross-talk coefficients. In other words, this realization recognizes the relationship that a value of a cross-talk coefficient for a symbol transmitted on an x-polarization of the optical signal is related to the values of the cross-talk coefficients of preceding or subsequent symbols transmitted on the x-polarization of the optical signal. Similarly, that a value of a cross-talk coefficient for a symbol transmitted on an y-polarization of the optical signal is related to the values of the cross-talk coefficients of preceding or subsequent symbols transmitted on the y-polarization of the optical signal.

For example, such an intermediate relationship can be represented on a scale between a zero value corresponding to the independence of the cross-talk coefficients and value of one corresponding to the equality of the cross-talk coefficients. In such a manner, the cross-talk coefficients can be related using weights having values between zero and one. Unfortunately, using weights for calculations prescribed by the cross-talk model adds additional computational burden and reduces the efficiency of the processor of the decoder.

To that end, some embodiments of the present disclosure consider the relationship among cross-talk coefficients indirectly by assuming their equality at some steps of the decoding, by assuming their independence at other steps of the decoding. In such a manner, the entire decoding considers the intermediate relationship among corresponding cross-talk coefficients without using weights of the intermediate relationship during the decoding. Once the cross-talk coefficients have been estimated, the transmitted symbols in both polarizations can be detected. In addition, the iterative structure of the systems and methods also improve the estimation quality from one iteration to the next.

According to an embodiment of the present disclosure, a method for decoding symbols transmitted over an optical communication channel having a cross-polarization modulation (XPolM) impairment, wherein an optical signal is polarized to encode the symbols on an x-polarization and an y-polarization before transmission. The method includes receiving the optical signal transmitted over the optical communication channel Sampling at least a portion of the optical signal to produce a sequence of digital samples, wherein each digital sample of the sequence of digital samples includes a measurement of each polarization of the optical signal at an instance of time. Selecting a subset of the sequence of digital samples that includes a digital sample and neighboring digital samples to the digital signal on the sequence. Determining jointly cross-talk coefficients for each digital sample in the subset of the digital samples by: determining cross-talk coefficients for the digital sample by jointly optimizing a likelihood of the subset of the digital samples to satisfy a cross-talk model. Wherein the cross-talk model connects, via the determined cross-talk coefficients, the measurements of the subset of the digital samples for each polarization of the optical signal with values of the symbols encoded at each polarization of the at least portion of the optical signal. Wherein the optimizing is subject to a constraint of equality of corresponding cross-talk coefficients for each polarization. Repeating the selecting and the determining for each digital sample remaining in the sequence of digital samples to produce a sequence of cross-talk coefficients. Finally, decoding at least some of the symbols from the sequence of digital samples using cross-talk models with corresponding cross-talk coefficients, wherein steps of the method are performed using a processor.

According to another embodiment of the present disclosure, a non-transitory computer readable storage medium embodied thereon a program executable by a processor for performing a method. The method for decoding symbols transmitted over an optical communication channel having a cross-polarization modulation (XPolM) impairment, wherein an optical signal is polarized to encode the symbols on an x-polarization and an y-polarization before transmitted. The method including storing, by the processor, the optical signal transmitted over the optical communication channel Producing, by the processor, a sequence of digital samples by sampling at least a portion of the optical signal, wherein each digital sample of the sequence of digital samples includes a measurement of each polarization of the optical signal at an instance of time. Selecting, by the processor, a subset of the sequence of digital samples that includes a digital sample and neighboring digital samples to the digital signal on the sequence. Determining, by the processor, jointly cross-talk coefficients for each digital sample in the subset of the digital samples by: determining cross-talk coefficients for the digital sample by jointly optimizing a likelihood of the subset of the digital samples to satisfy a cross-talk model. Wherein the cross-talk model connects, via the determined cross-talk coefficients, the measurements of the subset of the digital samples for each polarization of the optical signal with values of the symbols encoded at each polarization of the at least portion of the optical signal. Wherein the optimizing is subject to a constraint of equality of corresponding cross-talk coefficients for each polarization. Repeating the selecting and the determining for each digital sample remaining in the sequence of digital samples to produce a sequence of cross-talk coefficients. Finally, decoding at least some of the symbols from the sequence of digital samples using cross-talk models with corresponding cross-talk coefficients.

According to another embodiment of the present disclosure, a system for decoding symbols transmitted over an optical communication channel having a cross-polarization modulation (XPolM) impairment, wherein an optical signal is polarized to encode the symbols on an x-polarization and an y-polarization before transmission. The system including a receiver for receiving the optical signal transmitted over the optical communication channel A processor operatively connected to a memory and in communication with the receiver. The processor is configured to sample at least a portion of the optical signal to produce a sequence of digital samples, wherein each digital sample of the sequence of digital samples includes a measurement of each polarization of the optical signal at an instance of time. The processor selects a subset of the sequence of digital samples including a digital sample and neighboring digital samples to the digital sample in the sequence. The processor determines jointly cross-talk coefficients for each digital sample in the subset of the digital samples by: determining cross-talk coefficients for the digital sample by jointly optimizing a likelihood of the subset of the digital samples to satisfy a cross-talk model, the cross-talk model connects, via the determined cross-talk coefficients, the measurements of the subset of the digital samples for each polarization of the optical signal with values of the symbols encoded at each polarization of the at least portion of the optical signal, wherein the optimizing is subject to a constraint of equality of corresponding cross-talk coefficients for each polarization. The processor repeats the selecting and the determining for each digital sample remaining in the sequence of digital samples to produce a sequence of cross-talk coefficients. Finally, the processor decodes at least some of the symbols from the sequence of digital samples using cross-talk model with corresponding cross-talk coefficients.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 5A and 5B are block diagrams of embodiments used to evaluate weights of a filter to process received signals, according to embodiments of the present disclosure;

Figure 1A:
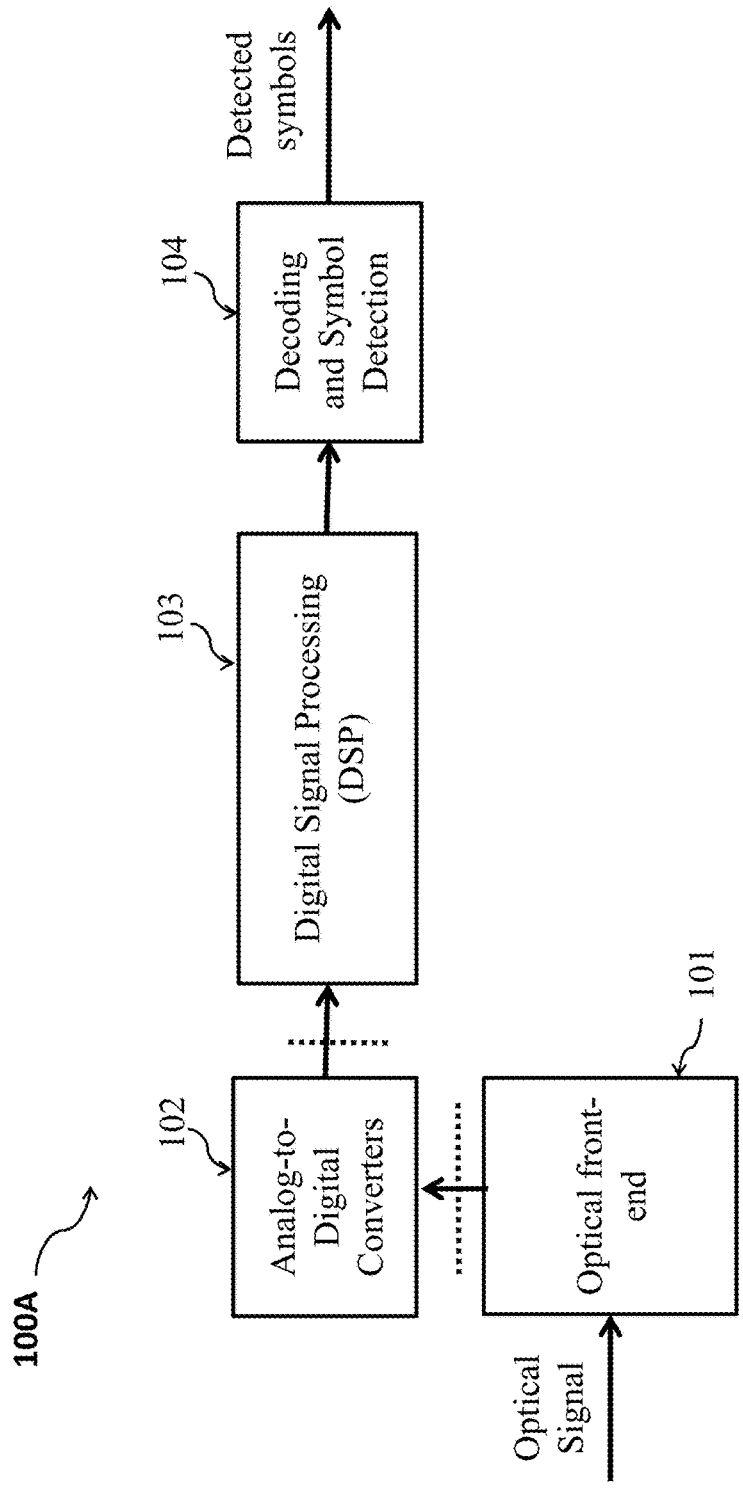
FIG. 1A is a block diagram illustrating an optical receiver, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According to embodiments of the present disclosure, methods and systems relate to a coherent fiber-optic communication system having an optical receiver adapted to receive an optical signal transmitted over an optical communication channel having cross polarization modulation (XPOLM) impairment. The optical receiver is configured to reduce distortions or polarization rotations caused by XPOLM. The received optical signal comprises of a signals transmitted at first polarization component (x-polarization) and a second polarization component (y-polarization). The first and second polarization components comprise sequences of transmitted symbols. The embodiments of the present disclosure do not pose any restriction on the type of modulation format such that the transmitted symbols may come from the M-ary Quadrature Amplitude Modulation (MQAM), M-ary Phase Shift Keying (MPSK), or any other type of modulation. Compensating the distortions caused by XPOLM impairment is important to improve the quality of an optical transmission system, among other things.

FIG. 1A illustrates an optical receiver 100A according to embodiments of the present disclosure. The optical receiver 100A, includes an optical front-end 101, which linearly maps the received optical signal from the fiber into analog electrical signals. The analog electrical signals comprise of a pair of in-phase and quadrature-phase components for each polarization and wavelength employed in the optical transmission through the fiber. The analog signals are converted to digital signals using Analog-to-Digital Converters 102. The digital signals are then processed in the Digital Signal Processing (DSP) 103, which incorporates multiple processing stages, with the goal to compensate linear and non-linear impairments arising in the fiber optical channel and align the received digital signals with the transmitted signals in time, frequency and phase. One or more stages in the DSP 103 compensates XPolM impairment according to principles of various embodiments. The signals at the DSP block 103 output are then applied to decoder 104 and the transmitted symbols and bits are detected.

Figure 1B:
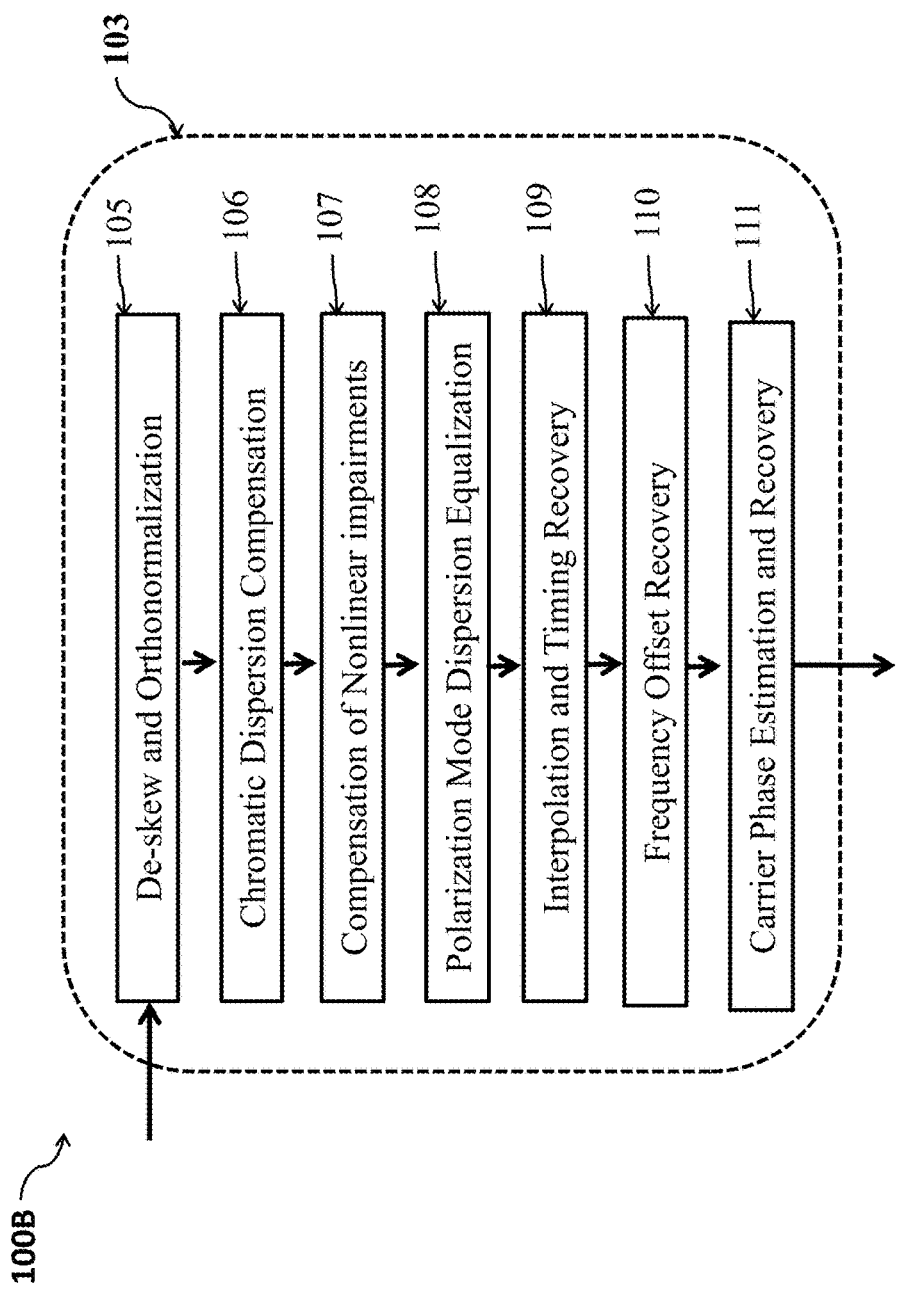
FIG. 1B is a block diagram illustrating a sequence of processing the received digital signals in the DSP block of FIG. 1A, according to embodiments of the present disclosure.

FIG. 1B is a block diagram illustrating a sequence of processing the received digital signals in the DSP block 103 of FIG. 1A, according to embodiments of the present disclosure. The DSP block 103 includes a number of processing stages such as de-skew and orthonormalization 105, chromatic dispersion (CD) compensation 106, non-linearity compensation 107, polarization mode dispersion (PMD) equalization 108, interpolation and timing recovery 109, frequency offset estimation and compensation 110, carrier phase estimation and recovery 111. These processing stages are not necessarily in this order. In addition, a variety of feedback loops between the processing stages can be established with the goal to improve performance. For example, after the carrier phase recovery 111, the resulting signal can be fed back to the frequency offset compensation stage 110. The processing stage addressing non-linear fiber optic impairments 107 may incorporate separate or joint compensation of Self Phase Modulation (SPM). Cross Phase Modulation (XPM), Cross-Polarization Modulation (XPolM), Four-Wave Mixing (FWM), or any combination of them. Moreover, some of the nonlinear impairments may be compensated separately of this processing stage. For example, the XPolM compensation, as described in the embodiments of current disclosure, may be employed after carrier phase recovery 111.

Figure 1C:
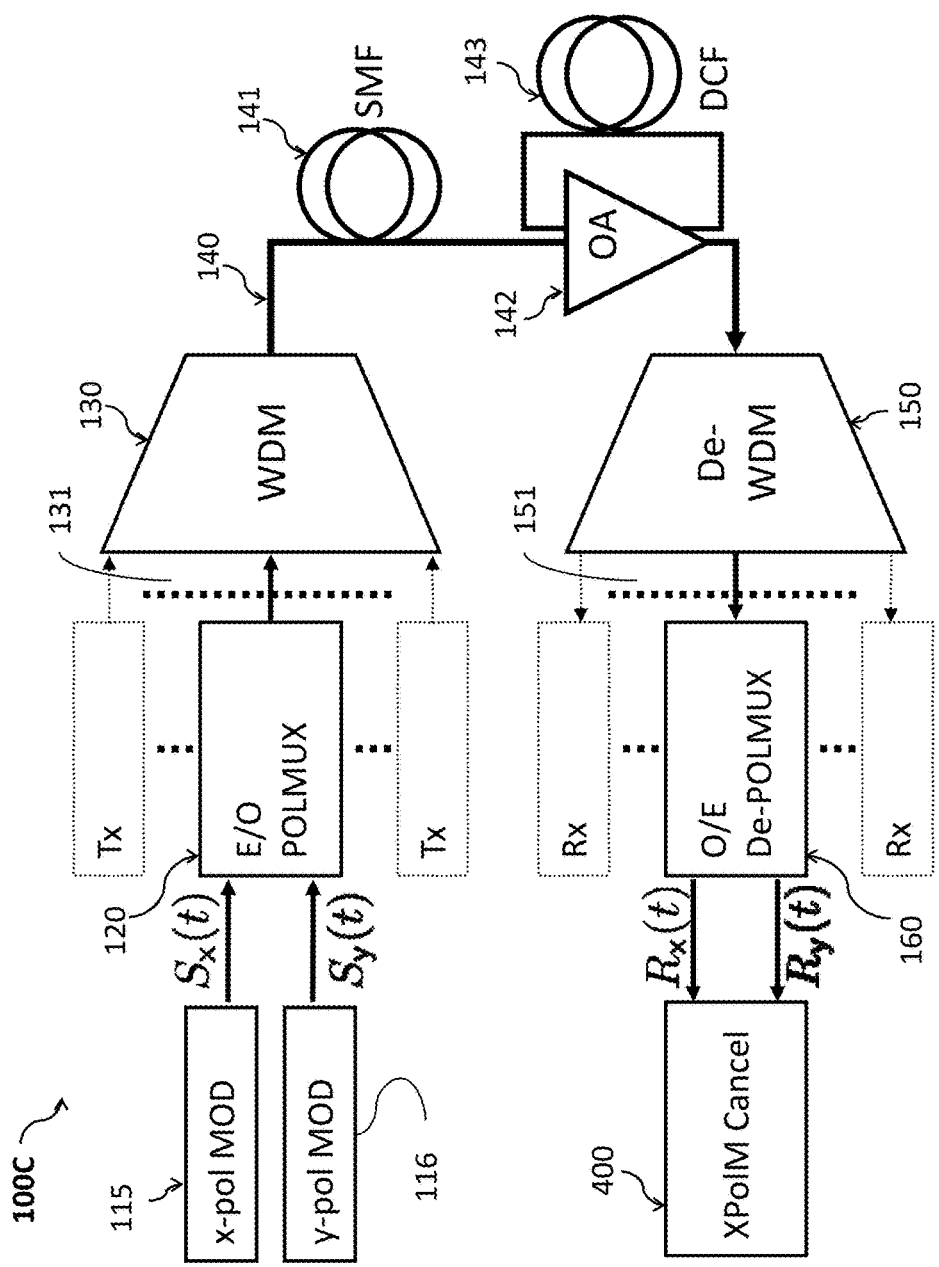
FIG. 1C is a block diagram illustrating a coherent fiber-optic communications system with dense-wavelength-division multiplexing (DWDM) and polarization multiplexing (POLMUX), according to embodiments of the present disclosure.

FIG. 1C is a block diagram of a coherent fiber-optic communication system 100C according to embodiments of the present disclosure. The coherent fiber-optic communication system 100C is for transmitting and receiving an optical signal that employs polarization multiplexing (POL-MUX) and an optical wavelength division multiplexing (WDM), according to embodiments of the present disclosure. At a certain channel of interest, x-polarization signal $s_x(t)$ and y-polarization signal $s_y(t)$, where t denotes time, are generated by electrical modulators such as dual-polarized (DP)-quadrature phase-shift keying (QPSK) 115 and 116, respectively. After passing through an electrical filter, x/y-polarization signals $s_x(t)$ and $s_y(t)$ are up-converted to an optical wave by an electrical-to-optical (E/O) modulator with POLMUX 120, which orthogonally polarizes $s_x(t)$ and $s_y(t)$.

The up-converted optical signal is then multiplexed with a number of other signals at different wavelengths 131 by a WDM multiplexer such as arrayed waveguide grating device 130. The WDM optical signals propagate through an optical fiber channel 140, which consists of multiple-span sets of single-mode fibers (SMF) 141, optical amplifiers (OA) such as Erbium doped fiber amplifier 142, and, optionally, dispersion compensation fibers (DCF) 143.

At the receiver end, WDM signals are first de-multiplexed by De-WDM device 150 whose outputs 151 are optical signals transmitted at different wavelengths. For the channel of interest, the optical signal is then converted into electrical signal by optical-to-electrical (O/E) converter with De-POLMUX 160, which obtains x-polarization received signal $r_x(t)$ and y-polarization received signal $r_y(t)$. These signals are further Analog-to-Digital converted 102 and processed in the DSP block 103, one processing step of which is the XPolM compensation.

When impairments other than XPolM are compensated, the samples $r_{x,n}=r_x(nT_s)$ and $r_{y,n}=r_y(nT_s)$ of the resulting signal, taken with sampling period $T_s$, at signaling time n corresponding to x- and y-polarization are modeled as $$\begin{bmatrix} r_{x,n} \\ r_{y,n} \end{bmatrix} = \begin{bmatrix} \sqrt{-1|\beta_n|^2} & \alpha_n \\ \beta_n & \sqrt{1-|\alpha_n|^2} \end{bmatrix} \begin{bmatrix} s_{x,n} \\ s_{y,n} \end{bmatrix} + \begin{bmatrix} v_{x,n} \\ v_{y,n} \end{bmatrix}, \quad (1)$$

where $\alpha_n$ and $\beta_n$ are the cross-talk coefficients, $s_{x,n}$ and $s_{y,n}$ are the transmitted symbols at signaling time n, and $v_{x,n}$ and $v_{y,n}$ are samples of circularly symmetric zero-mean white Gaussian noise of variance $\sigma_v^2$.

Figure 1D:
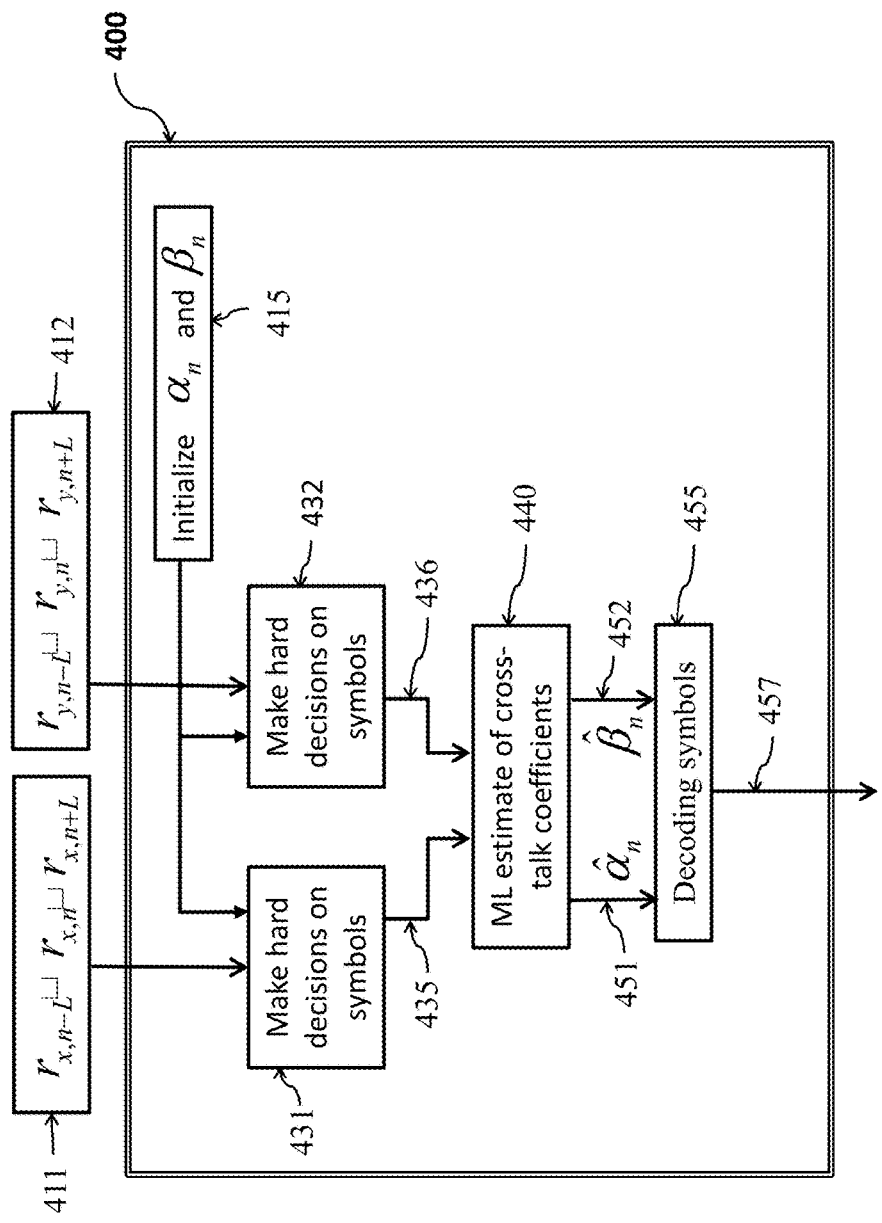
FIG. 1D is a block diagram of a method for estimating cross-talk coefficients, according to embodiments of the present disclosure.

Referring to FIG. 1D, the estimation of the cross-talk coefficients and transmitted symbols in both polarizations at symbol time n is carried out by considering L samples preceding and L samples following the considered symbol. These symbols are collected in 411 and 412, for x- and y-polarization, respectively. The samples 411 and 412 are passed to the devices 431 and 432 which make hard decisions corresponding to $r_{x,k}$ and $r_{y,k}$, denoted with $\hat{s}_{x,k}^{(l)}$, 435 and $\hat{s}_{y,k}^{(l)}$ 436, where k=n−L, . . . , n+L.

Still referring to FIG. 1D, in operation, the cross-talk coefficients are initialized 415 to some appropriate values (such as zero or some small number close to zero). In addition, zero forcing (ZF) (FIG. 5A), minimum mean square error (MMSE) equalization (FIG. 5B), or joint detection method (FIG. 6), detailed below, is employed for making hard decisions on symbols. Constraining that the cross-talk coefficients $\alpha_n$ and $\beta_n$ are the same across all samples (i.e. all digital samples) within the considered block (i.e. a block is a subset of all samples or all digital samples), the maximum likelihood (ML) estimates of the cross-talk coefficients are found 440. These estimates are the values of the cross-talk coefficients which maximize the likelihood of the samples of the received signal in the considered blocks under the cross-talk model (1). The estimated cross-talk coefficients can then be used to detect 455 the transmitted symbols in both polarizations corresponding to the considered symbol time n. The estimated cross-talk coefficients and decoded symbols are outputs 457 from the method. As noted above, the present disclosure considers the relationship among cross-talk coefficients indirectly by assuming their equality within a subset of the digital samples of the decoding, and assumes their independence at later steps of the decoding. In such a manner, the entire decoding considers the intermediate relationship among corresponding cross-talk coefficients without using weights of the intermediate relationship during the decoding. Further, the realization for the need to consider more accurately unknown or small correlations of the cross-talk coefficients when estimating XPolM is incorporated into the decoding. Once the cross-talk coefficients have been estimated, the transmitted symbols in both polarizations may be detected. Further, the iterative structure of the method also improves the estimation quality from one iteration to the next (see FIGS. 4A and 4B).

The outputs from the XPolM compensation method, according to embodiments of the present disclosure, are two sequences of soft or hard estimates of the transmitted symbols, or their likelihoods, where each sequence corresponds to one polarization. The hard symbol estimates can be mapped into bits according to the employed modulation format and delivered as final estimate of the bit sequence. More often, the sequences of likelihoods, or hard, or soft symbol estimates, are inputs to some other processing step in the DSP block, or decoder of the employed error correction code.

Figure 1E:
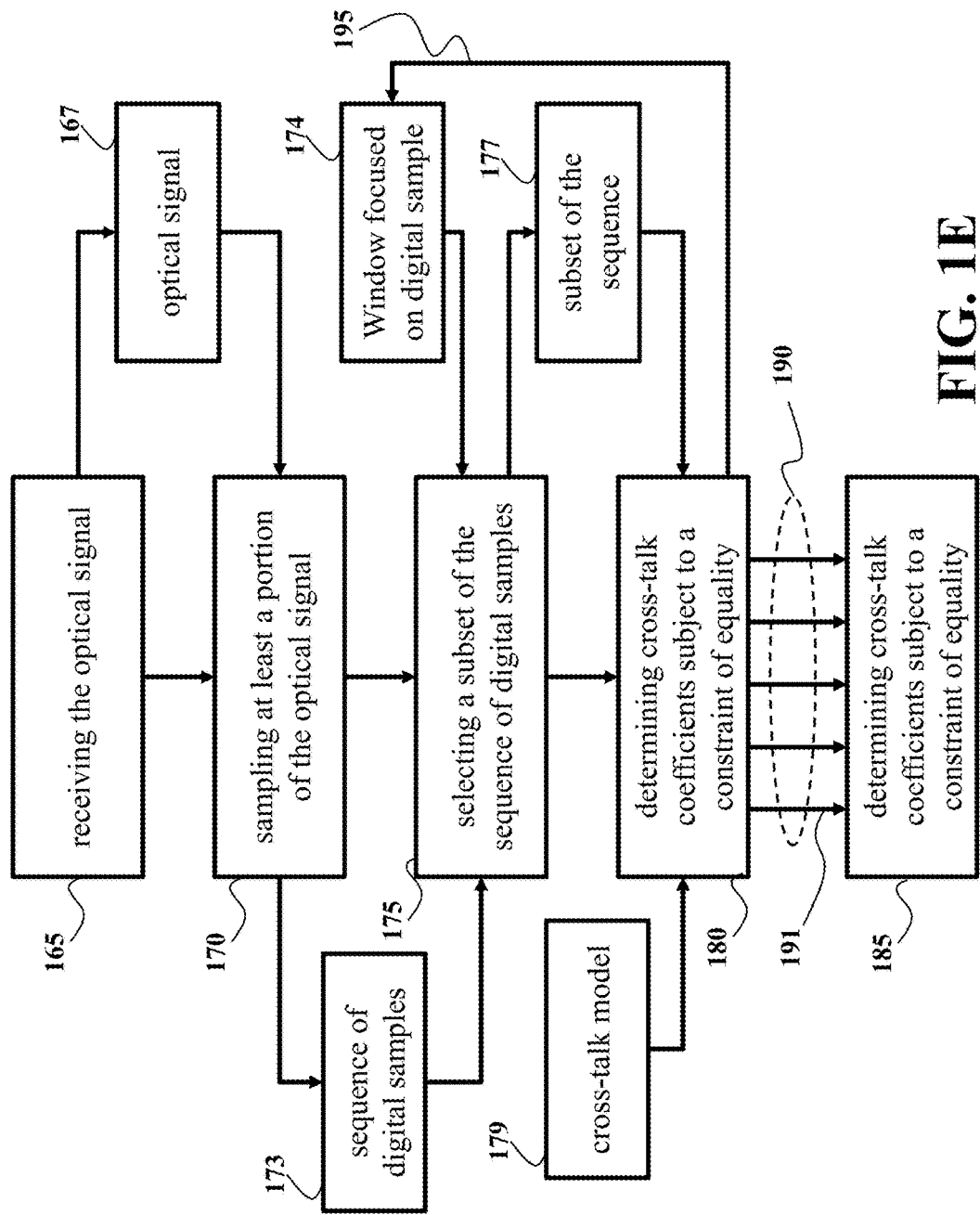
FIG. 1E is a block diagram of a method for decoding symbols transmitted over an optical communication channel according to some embodiments.

FIG. 1E shows a block diagram of a method for decoding symbols transmitted over an optical communication channel having a cross-polarization modulation (XPolM) impairment according to some embodiments. An optical signal is polarized to encode the symbols on an x-polarization and an y-polarization before transmission. The method can be implemented using a processor of an optical decoder.

The method receives 165 the optical signal 167 transmitted over the optical communication channel and samples 170 at least a portion of the optical signal to produce a sequence 173 of digital samples. Each digital sample of the sequence 173 of digital samples includes a measurement of each polarization of the optical signal at an instance of time. The method selects 175 a subset 177 of the sequence of digital samples including a digital sample and neighboring digital samples to the digital sample in the sequence. For example, the method can use a window 174 focused on the digital sample to select the subset of the digital samples that falls within a window. For example, if the window 174 has a size, i.e., can include 5 digital samples and is centered on the digital sample in the sequence 173, the subset 177 would include the digital sample and 2 digital samples on each side of the digital sample the window is centered on.

Next, the method determines jointly 180 cross-talk coefficients for each digital sample in the subset of the digital samples under subject to a constraint of equality of the cross-talk coefficients to produce cross-talk coefficients 191. Due to the equality constraints, the cross-talk coefficients 191 are determined only for the digital sample, e.g., the digital sample the window 174 is centered upon.

For example, the method determines the cross-talk coefficients for the digital sample by jointly optimizing a likelihood of the subset of the digital samples to satisfy a cross-talk model 179 that connects, via the determined cross-talk coefficients, the measurements of the subset of the digital samples for each polarization of the optical signal with values of the symbols encoded at each polarization of the at least portion of the optical signal. As mentioned, such an optimization is subject to a constraint of equality of corresponding cross-talk coefficients for each polarization.

Next, the method repeats 195 the selecting and the determining for each digital sample remaining in the sequence of digital samples to produce a sequence 190 of cross-talk coefficients. For example, the method slides the window 174 to be centered on the next digital sample in the sequence and selects another subset of the digital samples covered by the window.

In such a manner, some embodiments of the present disclosure consider the relationship among cross-talk coefficients indirectly by assuming their equality at some steps of the decoding and assumes their independence at other steps of the decoding. The equality at some steps of the decoding is considered while determine cross-talk coefficients 191. Such that their independence at other steps of the decoding is considered by renewing 195 determinations of the cross-talk coefficients. In such a manner, the entire decoding considers the intermediate relationship among corresponding cross-talk coefficients without using weights of the intermediate relationship during the decoding. After the cross-talk coefficients have been estimated, the method decodes 185 at least some of the symbols from the sequence of digital samples using cross-talk model with corresponding cross-talk coefficients.

Figure 2:
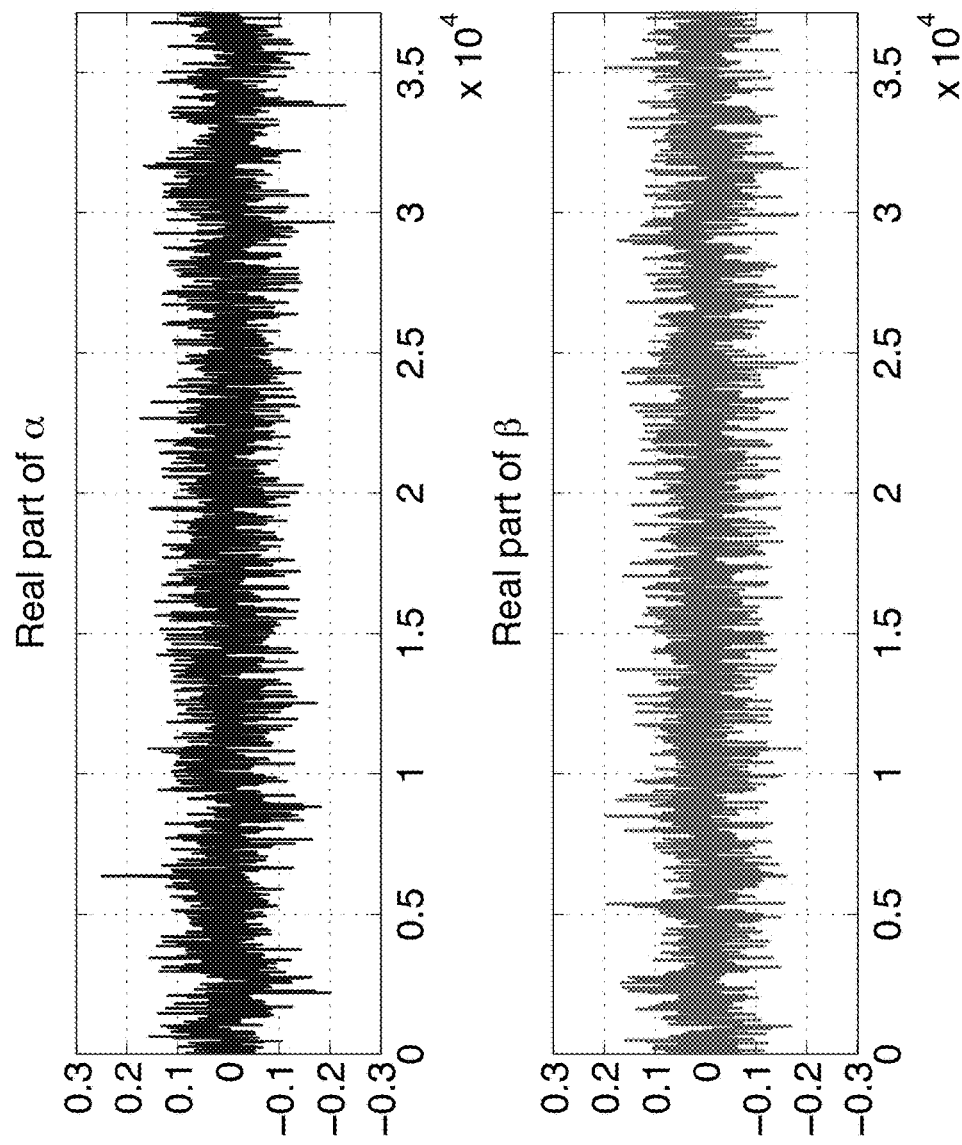
FIG. 2 is a graph illustrating a time variation of real parts of experimentally measured cross-talk coefficients, according to embodiments of the present disclosure.

Referring to FIG. 2, which shows real parts of the experimentally measured cross-talk coefficients, we conclude that the cross-talk coefficients have small magnitudes.

Figure 3:
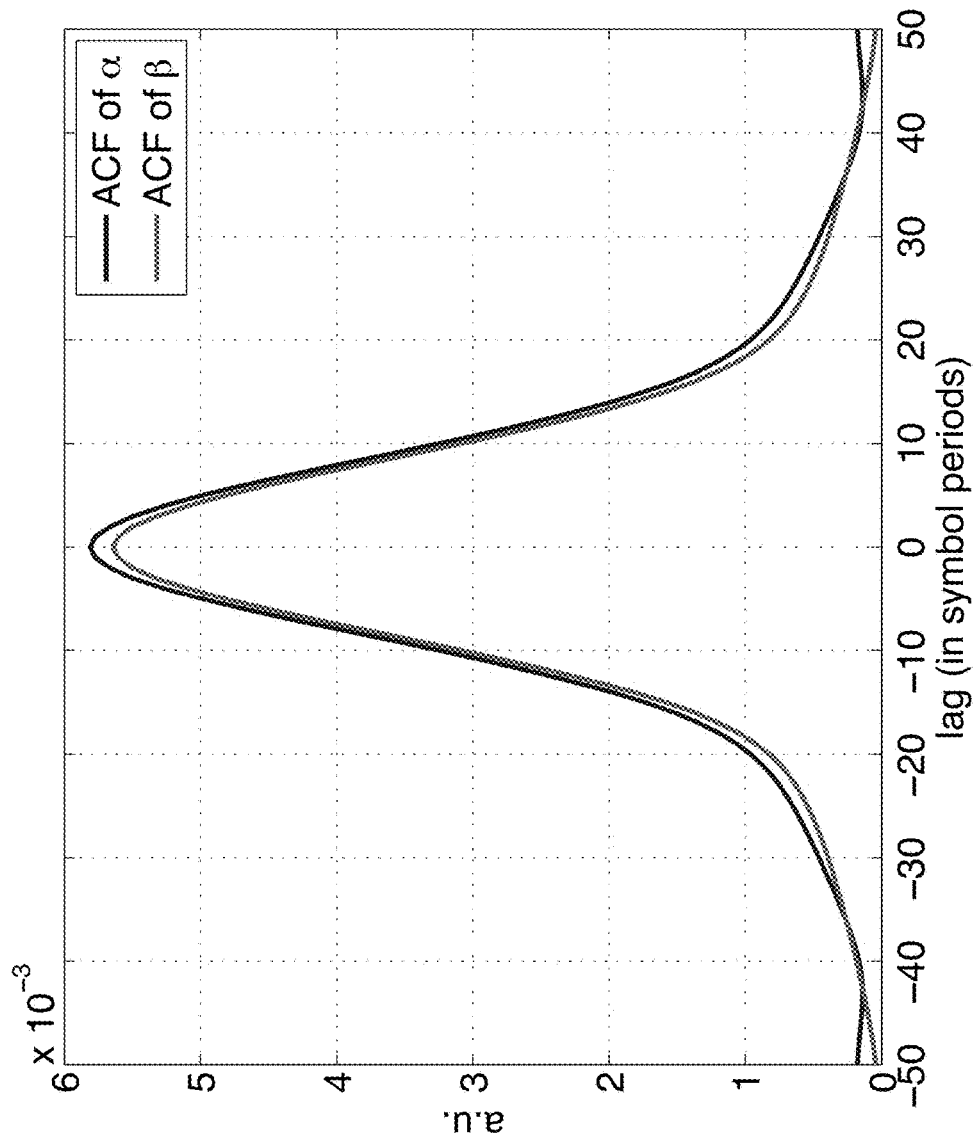
FIG. 3 is a graph illustrating an autocorrelation function of experimentally measured cross-talk coefficients, according to embodiments of the present disclosure.

Referring to FIG. 3, further, the systems and methods take into account that the magnitude of cross-talk coefficients $\alpha_n$ and $\beta_n$ is much smaller than 1. This can also be observed from the autocorrelation function of the experimentally measured cross-talk coefficients, shown in FIG. 3, which indicates that the power in cross-talk coefficients is less than $6 \times 10^{-3}$. Thus, $\sqrt{1-|\alpha n|^2} \approx 1$ and $\sqrt{1-|\beta n|^2} \approx 1$ and the cross-talk model (1) is approximated as $$\begin{bmatrix} r_{x,n} \\ r_{y,n} \end{bmatrix} \approx \begin{bmatrix} 1 & \alpha_n \\ \beta_n & 1 \end{bmatrix} \begin{bmatrix} s_{x,n} \\ s_{y,n} \end{bmatrix} + \begin{bmatrix} v_{x,n} \\ v_{y,n} \end{bmatrix}, \quad (2)$$

In the sequel, the approximated model (2) is used to simplify the algebra and obtain closed form expressions. However, the same working principles as those detailed in the sequel can be applied to the original model (1), at the expense of more demanding computations.

Figure 4A:
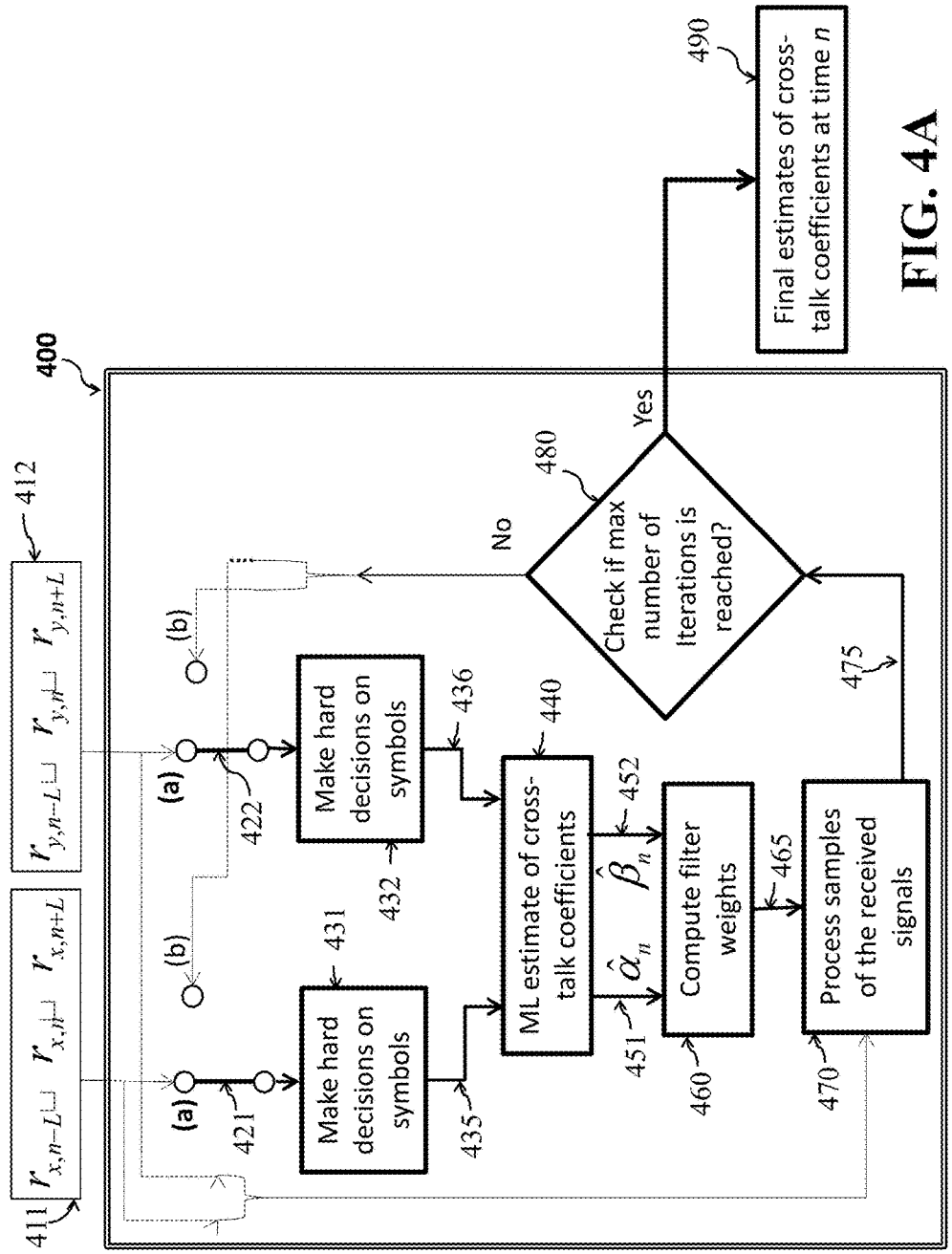
FIG. 4A is a block diagram of a method which estimates cross-talk coefficients, specific for the first iteration, where the switches are in positions (a), according to embodiments of the present disclosure.
Figure 4B:
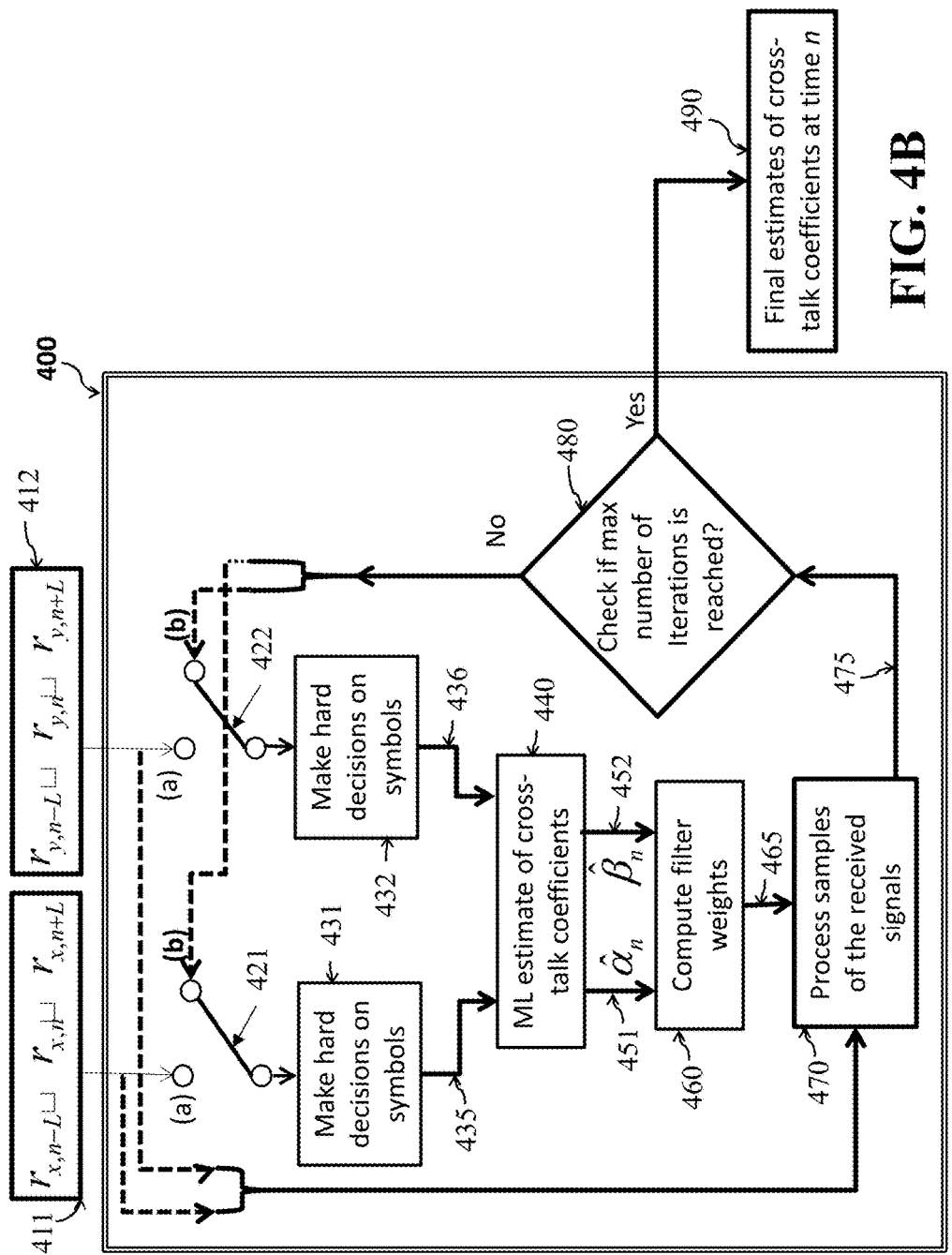
FIG. 4B is a block diagram of a method which estimates cross-talk coefficients, specific for all other iterations l>1, where the switches are in positions (b), according to embodiments of the present disclosure.

Referring to FIGS. 4A and 4B, the proposed XPolM compensation method is iterative and the XPolM compensation method block diagram. The estimation of the cross-talk coefficients and transmitted symbols in both polarizations at symbol time n is carried out by considering L samples preceding and L samples following the considered symbol. These symbols are collected in 411 and 412, for x- and y-polarization, respectively.

Referring to FIG. 4A, in first iteration, the switches 421 and 422 are in positions (a). Thus, the samples 411 and 412 are passed to the devices 431 and 432 which make hard decisions corresponding to $r_{x,k}$ and $r_{y,k}$, denoted with $\hat{s}_{x,k}^{(1)}$ 435 and $\hat{s}_{y,k}^{(1)}$ 436, where k=n−L, . . . , n+L.

Referring to FIG. 4B, in all other iterations l>1, the switches 421 and 422 are in positions (b). At an iteration l, assumed is that the cross-talk coefficients $\alpha_n$ and $\beta_n$ are the same across all samples within the considered block. Therefore, their maximum likelihood (ML) estimates are after some probabilistic modeling and algebraic manipulations (omitted here) given by $$\hat{\alpha}_n^{(l)} = \frac{\sum_{k=n-L}^{n+L} \hat{s}_{k,y}^{(l)*}(r_{k,x} - \hat{s}_{k,x}^{(l)})}{\sum_{k=n-L}^{n+L} \hat{s}_{k,y}^{(l)*}\hat{s}_{k,y}^{(l)}}, \quad (3)$$

$$\hat{\beta}_n^{(l)} = \frac{\sum_{k=n-L}^{n+L} \hat{s}_{k,x}^{(l)*}(r_{k,y} - \hat{s}_{k,y}^{(l)})}{\sum_{k=n-L}^{n+L} \hat{s}_{k,x}^{(l)*}\hat{s}_{k,x}^{(l)}}, \quad (4)$$

The ML estimates of the cross-talk coefficients 451 and 452, are evaluated in 440.

The cross-talk coefficient estimates 451 and 452 are then used to process the samples $r_{k,x}$ 411, $r_{k,y}$ 412, k=n−L, . . . , n+L in order to estimate the transmitted symbols. To that end, the ML estimates 451 and 452 are used to evaluate processor weights 465. The processor weights are then applied in 470 to the samples 411 and 412, which yields the output 475. Since the switches 421 and 422 are in positions (b) after the very first iteration, the output 475 is then passed to 431 and 432 to make hard decisions on the transmitted symbols.

FIGS. 5A and 5B are block diagrams of embodiments used to evaluate weights of a filter to process received signals, according to embodiments of the present disclosure FIG. 5A shoes that the processor 470 can be a zero-forcing (ZF) equalizer, whose weights 465, evaluated in 510, are given by $$W_{ZF} = (GG^H)^{-1}G \quad (5)$$

where G is the matrix of cross-talk coefficients, $$G = \begin{bmatrix} 1 & \hat{\alpha}_n \\ \hat{\beta}_n & 1 \end{bmatrix}, \quad (6)$$

Therefore, the soft symbol estimates 475, obtained at the ZF equalizer output, are given by $$\begin{bmatrix} \hat{s}_{x,k}^{(l)} \\ \hat{s}_{y,k}^{(l)} \end{bmatrix} = (GG^H)^{-1}G \begin{bmatrix} r_{x,k} \\ r_{y,k} \end{bmatrix}, \quad (7)$$

Referring to FIG. 5B, alternatively, the processor 470 can be a minimum mean square error (MMSE) equalizer, whose weights 465 are evaluated in 520. The soft symbol estimates 475 are in this case given by $$\begin{bmatrix} \hat{s}_{x,k}^{(l)} \\ \hat{s}_{y,k}^{(l)} \end{bmatrix} = (GG^H + \sigma_v^2 I)^{-1}G \begin{bmatrix} r_{x,k} \\ r_{y,k} \end{bmatrix}, \quad (8)$$

Noted is that the matrix inverse required in (9) and (7) is relatively easy to compute since the matrix is of order two and its inverse can be obtained directly from corresponding formulas.

Figure 6:
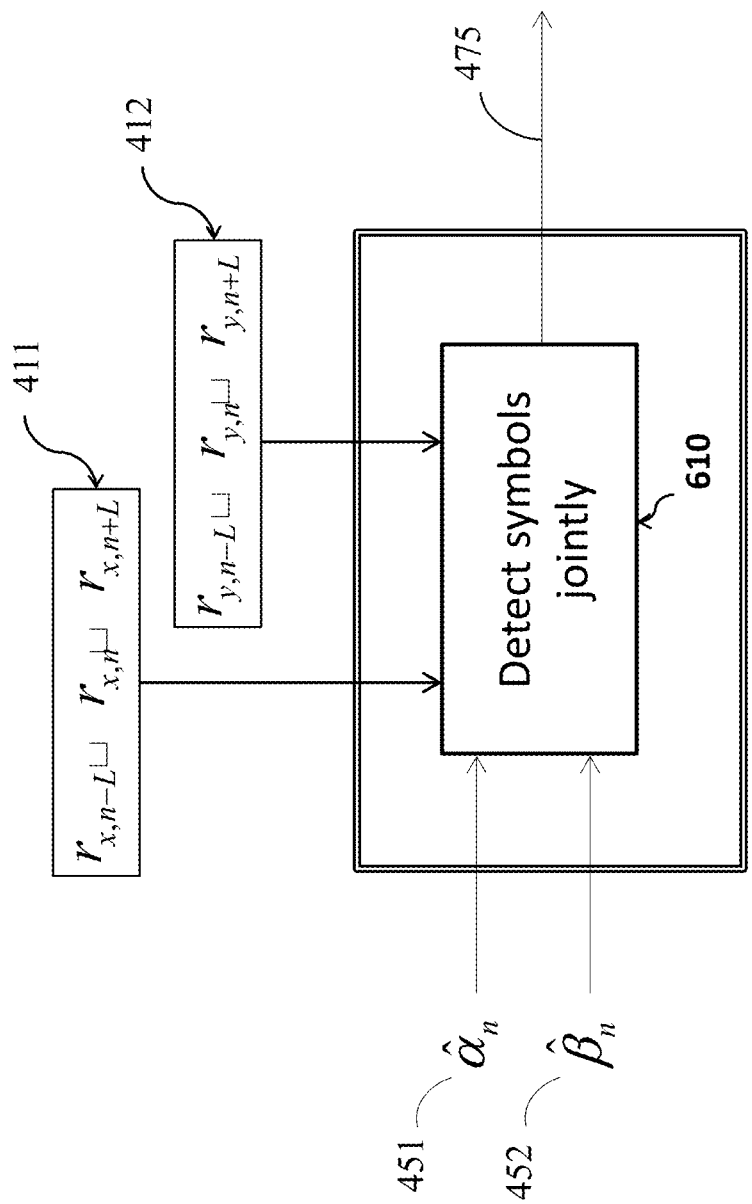
FIG. 6 is a block diagram of joint detection of symbols, according to embodiments of the present disclosure.

Referring to FIG. 6, in yet another embodiment, the transmitted symbols can be estimated jointly 610 from the ML estimates of cross-talk coefficients 451, 452, and samples of the received signals 411, 412. The output 475 of joint detection is a sequence of posterior probability distributions for each transmitted symbol in the considered block. The mapping 431, 432 to hard symbol decisions is then done by means of maximum a-posteriori probability (MAP).

The computational complexity of joint detection is prohibitively high for denser modulation formats, such as for 64-quadrature amplitude modulation (64-QAM). In such a case, the MMSE equalization 520 is probably better suited. The MMSE approach is further justified by the fact that the cross-talk coefficients are much smaller than 1, such that the matrix G is diagonally dominant.

The described process is repeated a certain number of iterations I. The iteration count is monitored in 480, which at some point terminates the iterations. The iterative procedure yields 490 the final estimates of cross-talk coefficients, $\hat{\alpha}_n^{(I)}$ and $\hat{\beta}_n^{(I)}$, corresponding to discrete time instant n.

Figure 7:
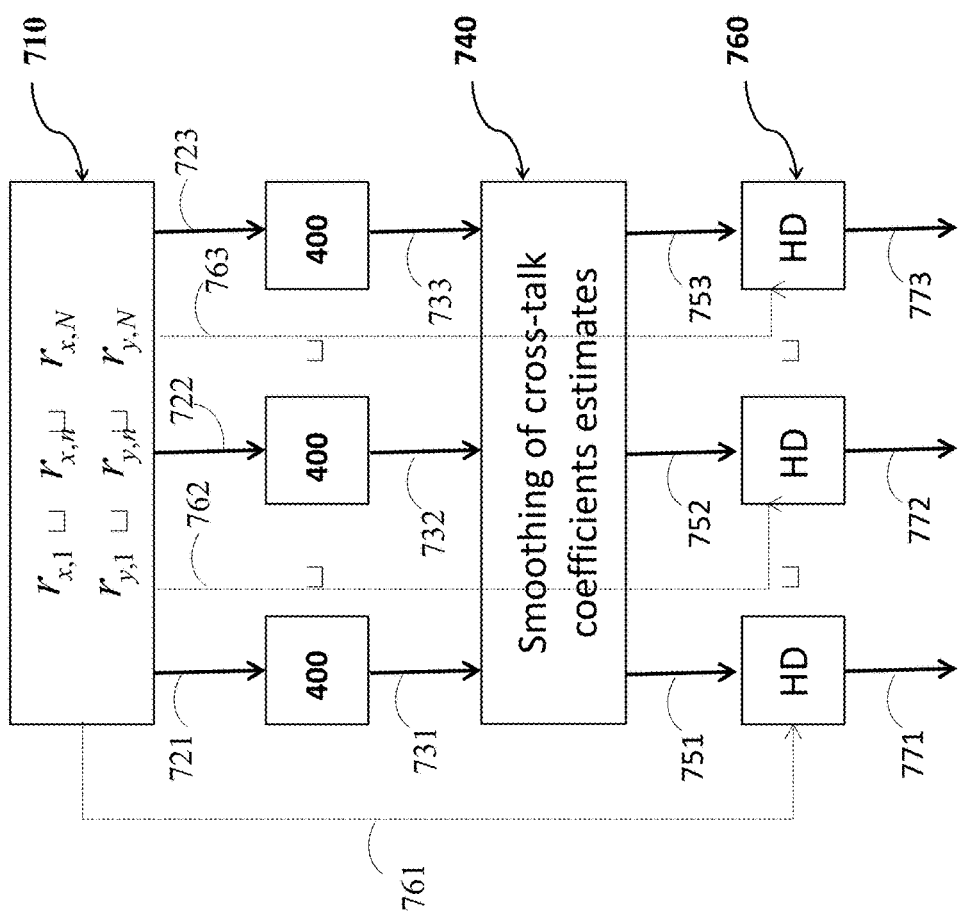
FIG. 7 is a block diagram of a parallel estimation of cross-talk coefficients and transmitted symbol detection, according to embodiments of the present disclosure.

FIG. 7 illustrates a schematic block diagram of the method used to obtain final hard decision estimates of the transmitted symbols. As elaborated above, a separate iterative procedure is employed in parallel to estimate cross-talk coefficients corresponding to each symbol time n, n=1, . . . ,N, where N is the number of symbols in a block. An iterative procedure 400, corresponding to symbol n, takes as an input 722 a block of samples between time instants n−L and n+L. Note that block 721 corresponding to time n=1 contains samples between time instants 1 and L+1. Analogously, block 723 contains samples between time instants N−L and N.

The outputs from iterative procedures 400, 731, 732, 733, are provisional estimates of cross-talk coefficients at times 1, . . . ,n, . . . ,N. To smoothen out possibly abrupt variations in a sequence of cross-talk coefficients, a processor 740 is applied over the provisional cross-talk estimates. This step yields final estimates of the cross-talk coefficients 751, 752, 753. The processor can implement simple moving average (MA) filtering, such that the final estimate of a cross talk coefficient at time n is given by $$\hat{\alpha}_n = \frac{1}{2K+1} \sum_{i=n-K}^{n+K} \hat{\alpha}_i^{(I)}, \qquad (9)$$

where 2K+1 is the length of the MA filter. An analogous expression is used for cross-talk coefficient corresponding to other polarization. Note that smaller number of values are averaged at the edges of a block. If time-evolution of cross-talk coefficients is known or appropriately modeled, other smoothing processors can be designed.

The final estimates of cross-talk coefficients 751, 752, 753, $\hat{\alpha}_n$ and $\hat{\beta}_n$, and samples of the received signal in both polarizations at time n, $r_{x,n}$ and $r_{y,n}$, 761, 762, 763, are used to obtain hard decision (HD) on the transmitted symbols at time n, $\hat{s}_{x,n}$ and $\hat{s}_{y,n}$ 771, 772, 773. This is done in 760 by means of zero-forcing (ZF) equalization 510, MMSE equalization 520, or joint detection 610, as described above. As indicated in FIG. 7, all HD processors act in parallel.

Alternatively, the ZF or MMSE equalization can be used to obtain soft estimates of the transmitted symbols or their likelihoods. Moreover, the likelihoods can be evaluated using the joint detection.

According to an embodiment of the present disclosure, an optical receiver for decoding an optical signal transmitted by a transmitter over an optical channel. The optical receiver includes a front end for receiving the transmitted optical signal to produce a digital signal including data symbols and pilot symbols. A Digital Signal Processing (DSP) having multiple processing stages, so as to compensate linear and non-linear impairments arising in the optical channel and align the received digital signals with the transmitted signals in time, frequency and phase. An XPolM impairment processing stage of the multiple processing stages, wherein the XPolM impairment processing stage is processed using a processor in communication with a memory. The processor is configured to: sample at least a portion of the optical signal to produce a sequence of digital samples, wherein each digital sample of the sequence of digital samples includes a measurement of each polarization of the optical signal at an instance of time; select a subset of the sequence of digital samples including a digital sample and neighboring digital samples to the digital sample in the sequence; determining jointly cross-talk coefficients for each digital sample in the subset of the digital samples by: determine cross-talk coefficients for the digital sample by jointly optimizing a likelihood of the subset of the digital samples to satisfy a cross-talk model, the cross-talk model connects, via the determined cross-talk coefficients, the measurements of the subset of the digital samples for each polarization of the optical signal with values of the symbols encoded at each polarization of the at least portion of the optical signal, wherein the optimizing is subject to a constraint of equality of corresponding cross-talk coefficients for each polarization; repeat the selecting and the determining for each digital sample remaining in the sequence of digital samples to produce a sequence of cross-talk coefficients; and a decoder for decoding at least some of the symbols from the sequence of digital samples using cross-talk model with corresponding cross-talk coefficients, to produce an XPolM impairment estimate of the received optical signal, and an improved quality of an optical transmission system.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for decoding symbols transmitted over an optical communication channel having a cross-polarization modulation (XPolM) impairment, wherein an optical signal is polarized to encode the symbols on an x-polarization and an y-polarization before transmission, comprising:
   receiving the optical signal transmitted over the optical communication channel;
   sampling at least a portion of the optical signal to produce a sequence of digital samples, wherein each digital sample of the sequence of digital samples includes a measurement of each polarization of the optical signal at an instance of time;
   selecting a subset of the sequence of digital samples including a digital sample and neighboring digital samples to the digital sample in the sequence;
   determining jointly cross-talk coefficients for each digital sample in the subset of the digital samples by:
      determining cross-talk coefficients for the digital sample by jointly optimizing a likelihood of the subset of the digital samples to satisfy a cross-talk model, the cross-talk model connects, via the determined cross-talk coefficients, the measurements of the subset of the digital samples for each polarization of the optical signal with values of the symbols encoded at each polarization of the at least portion of the optical signal, wherein the optimizing is subject to a constraint of equality of corresponding cross-talk coefficients for each polarization;
   repeating the selecting and the determining for each digital sample remaining in the sequence of digital samples to produce a sequence of cross-talk coefficients; and
   decoding at least some of the symbols from the sequence of digital samples using cross-talk model with corresponding cross-talk coefficients, wherein steps of the method are performed using a processor.

2. The method of claim 1, wherein the determining of the cross-talk coefficients includes:
   determining the cross-talk coefficients iteratively by alternating between estimating the cross-talk coefficients for the digital sample and decoding a transmitted symbol from the digital sample.

3. The method of claim 1, wherein the selecting of the subset of the sequence of digital samples includes:
   selecting a window of a predetermined length defining a size of the subset of digital samples;
   arranging the window on the sequence of digital samples, such that a center of the window is positioned on the digital sample; and
   selecting elements of the sequence of digital samples covered by the window into the subset of digital samples.

4. The method of claim 3, wherein repeating of the selecting for a subsequent digital sample comprises:
   sliding the window on the sequence of digital sample, such that the center of the window is positioned on the subsequent digital sample, to select the subset of digital samples neighboring the subsequent digital sample.

5. The method of claim 1, further comprising
   detecting the symbols using a zero-forcing equalization.

6. The method of claim 1, further comprising
   detecting the symbols using a minimum mean square error equalization.

7. The method of claim 1, further comprising
   detecting the symbols using a joint detection.

8. The method of claim 1, further comprising
   filtering values in the sequence of the cross-talk coefficients.

9. The method of claim 8, wherein the filtering uses a Kalman filter.

10. The method of claim 8, wherein the filtering uses a moving average filter.

11. A non-transitory computer readable storage medium embodied thereon a program executable by a processor for performing a method, the method for decoding symbols transmitted over an optical communication channel having a cross-polarization modulation (XPolM) impairment, wherein an optical signal is polarized to encode the symbols on an x-polarization and an y-polarization before transmitted, the method comprising:
   storing, by the processor, the optical signal transmitted over the optical communication channel;
   producing, by the processor, a sequence of digital samples by sampling at least a portion of the optical signal, wherein each digital sample of the sequence of digital samples includes a measurement of each polarization of the optical signal at an instance of time;
   selecting, by the processor, a subset of the sequence of digital samples that includes a digital sample and neighboring digital samples to the digital signal on the sequence;
   determining, by the processor, jointly cross-talk coefficients for each digital sample in the subset of the digital samples by:
      determining cross-talk coefficients for the digital sample by jointly optimizing a likelihood of the subset of the digital samples to satisfy a cross-talk model, the cross-talk model connects, via the determined cross-talk coefficients, the measurements of the subset of the digital samples for each polarization of the optical signal with values of the symbols encoded at each polarization of the at least portion of the optical signal, wherein the optimizing is subject to a constraint of equality of corresponding cross-talk coefficients for each polarization;
   repeating the selecting and the determining for each digital sample remaining in the sequence of digital samples to produce a sequence of cross-talk coefficients; and decoding at least some of the symbols from the sequence of digital samples using cross-talk models with corresponding cross-talk coefficients.

12. The method of claim 11, wherein the determining of the cross-talk coefficients includes:

determining the cross-talk coefficients iteratively by alternating between estimating the cross-talk coefficients for the digital sample and decoding a transmitted symbol from the digital sample.

13. The method of claim 11, wherein the selecting of the subset of the sequence of digital samples includes:

selecting a window of a predetermined length defining a size of the subset of digital samples;

arranging the window on the sequence of digital samples, such that a center of the window is positioned on the digital sample; and selecting elements of the sequence of digital samples covered by the window into the subset of digital samples.

14. The method of claim 13, wherein repeating of the selecting for a subsequent digital sample includes:

sliding the window on the sequence of digital sample, such that the center of the window is positioned on the subsequent digital sample, to select the subset of digital samples neighboring the subsequent digital sample.

15. The method of claim 11, further comprising detecting the symbols using a zero-forcing equalization.

16. The method of claim 11, further comprising detecting the symbols using a minimum mean square error equalization.

17. The method of claim 11, further comprising detecting the symbols using a joint detection.

18. The method of claim 11, further comprising filtering values in the sequence of the cross-talk coefficients.

19. The method of claim 18, wherein the filtering uses a Kalman filter.

20. A system for decoding symbols transmitted over an optical communication channel having a cross-polarization modulation (XPolM) impairment, wherein an optical signal is polarized to encode the symbols on an x-polarization and an y-polarization before transmission, the system comprising:

a receiver for receiving the optical signal transmitted over the optical communication channel;

a processor operatively connected to a memory and in communication with the receiver, the processor is configured to:

sample at least a portion of the optical signal to produce a sequence of digital samples, wherein each digital sample of the sequence of digital samples includes a measurement of each polarization of the optical signal at an instance of time;

select a subset of the sequence of digital samples including a digital sample and neighboring digital samples to the digital sample in the sequence;

determine jointly cross-talk coefficients for each digital sample in the subset of the digital samples by:

determine cross-talk coefficients for the digital sample by jointly optimizing a likelihood of the subset of the digital samples to satisfy a cross-talk model, the cross-talk model connects, via the determined cross-talk coefficients, the measurements of the subset of the digital samples for each polarization of the optical signal with values of the symbols encoded at each polarization of the at least portion of the optical signal, wherein the optimizing is subject to a constraint of equality of corresponding cross-talk coefficients for each polarization;

repeat the selecting and the determining for each digital sample remaining in the sequence of digital samples to produce a sequence of cross-talk coefficients; and decode at least some of the symbols from the sequence of digital samples using cross-talk model with corresponding cross-talk coefficients.

* * * * *